United States Patent
Balczunas et al.

(10) Patent No.: US 10,221,726 B2
(45) Date of Patent: Mar. 5, 2019

(54) CONDENSING HEAT RECOVERY STEAM GENERATOR

(71) Applicant: Cockerill Maintenance & Ingenierie S.A, Seraing (BE)

(72) Inventors: Nicolas Balczunas, Liege (BE); Sebastien Borguet, Saint-Remy (BE)

(73) Assignee: COCKERILL MAINTENANCE & INGENIERIE S.A., Seraing (BE)

( * ) Notice: Subject to any disclaimer, the term of this patent is extended or adjusted under 35 U.S.C. 154(b) by 368 days.

(21) Appl. No.: 14/975,920

(22) Filed: Dec. 21, 2015

(65) Prior Publication Data

US 2017/0175589 A1 Jun. 22, 2017

(51) Int. Cl.
| | |
|---|---|
| *F01K 23/10* | (2006.01) |
| *F02C 6/18* | (2006.01) |
| *F23J 15/04* | (2006.01) |
| *F23L 15/04* | (2006.01) |
| *F22D 1/02* | (2006.01) |
| *F01K 23/06* | (2006.01) |

(52) U.S. Cl.
CPC .......... *F01K 23/101* (2013.01); *F01K 23/065* (2013.01); *F22D 1/02* (2013.01); *F01K 23/10* (2013.01); *F02C 6/18* (2013.01); *F23J 15/04* (2013.01); *F23L 15/04* (2013.01); *Y02E 20/16* (2013.01)

(58) Field of Classification Search
CPC . Y02E 20/14; Y02E 20/16; F22D 1/02; F22D 1/36; F22D 1/38; F01K 23/10; F01K 17/025; F24D 10/00; F24D 2200/18
See application file for complete search history.

(56) References Cited

U.S. PATENT DOCUMENTS

| 3,498,062 A | * | 3/1970 | Daltry | ..................... F01D 25/14 165/110 |
| 3,693,557 A | * | 9/1972 | Makuch | ................... F23J 15/04 110/186 |

(Continued)

FOREIGN PATENT DOCUMENTS

| CN | 101922821 A | 12/2010 |
| WO | WO 2010136795 A2 | 12/2010 |
| WO | WO 2015039840 A2 | 3/2015 |

*Primary Examiner* — Todd E Manahan
*Assistant Examiner* — Eric Linderman
(74) *Attorney, Agent, or Firm* — Leydig, Voit & Mayer, Ltd.

(57) ABSTRACT

A condensing heat recovery steam generator (cHRSG) includes a main stack for an exhaust hot gas main flow, a bypass stack for allowing a fraction of exhaust hot gas to bypass the exhaust hot gas main flow, and a heat pump. The cHRSG includes a primary water circuit, a secondary water circuit, and a tertiary water circuit. The cHRSG additionally includes a feedwater line, a first heat exchanger for providing heat exchange between the feedwater line and the secondary water circuit, and a second heat exchanger for providing heat exchange between the primary water circuit and the tertiary water circuit. In the cHRSG, latent heat is partially recovered from said exhaust hot gas circulating in the bypass stack through the second heat exchanger and additional heat is extracted in the tertiary water circuit by said heat pump, contributing to a preheating performed in a preheater of the primary water circuit.

4 Claims, 9 Drawing Sheets

(56) References Cited

U.S. PATENT DOCUMENTS

| | | | | |
|---|---|---|---|---|
| 4,418,527 A * | 12/1983 | Schlom | F01K 21/047 | 60/39.53 |
| 4,489,679 A * | 12/1984 | Holt | F22D 1/00 | 110/186 |
| 4,660,511 A * | 4/1987 | Anderson | F01K 23/04 | 122/1 C |
| 4,896,500 A * | 1/1990 | Pavel | B01D 19/0068 | 60/39.182 |
| 5,088,280 A * | 2/1992 | Scott-Scott | F02C 7/047 | 60/257 |
| 5,178,210 A * | 1/1993 | Guillet | F23L 15/04 | 122/DIG. 1 |
| 5,564,269 A * | 10/1996 | Briesch | F01K 21/042 | 60/39.182 |
| 5,628,183 A * | 5/1997 | Rice | F01K 21/042 | 122/7 B |
| 5,878,675 A * | 3/1999 | Iijima | B01D 53/504 | 110/203 |
| RE36,497 E * | 1/2000 | Tomlinson | F01K 23/106 | 60/39.182 |
| 7,073,337 B2 * | 7/2006 | Mangin | B01D 3/007 | 60/783 |
| 7,669,418 B2 * | 3/2010 | Chino | F01K 17/005 | 60/645 |
| 9,353,682 B2 * | 5/2016 | Wichmann | F02C 9/16 | |
| 2002/0023423 A1 * | 2/2002 | Viteri | F01K 21/047 | 60/772 |
| 2004/0243350 A1 * | 12/2004 | Smith | F01K 7/22 | 702/185 |
| 2005/0039433 A1 * | 2/2005 | Nakano | F01D 15/10 | 60/39.08 |
| 2007/0084418 A1 * | 4/2007 | Gurevich | F22B 1/1815 | 122/1 B |
| 2007/0129450 A1 * | 6/2007 | Barnicki | C10G 2/30 | 518/704 |
| 2007/0186476 A1 * | 8/2007 | Briesch | C10J 3/466 | 48/210 |
| 2008/0141646 A1 * | 6/2008 | Yoshida | F01K 23/068 | 60/39.12 |
| 2009/0205340 A1 * | 8/2009 | Bolis | F01K 21/047 | 60/775 |
| 2009/0220401 A1 * | 9/2009 | Nakagawa | B01D 53/8625 | 423/239.1 |
| 2009/0282803 A1 * | 11/2009 | Bono | B01D 53/343 | 60/39.5 |
| 2010/0031655 A1 * | 2/2010 | Brown | F01K 9/003 | 60/645 |
| 2010/0071342 A1 * | 3/2010 | Siden | F01D 25/30 | 60/39.182 |
| 2010/0215558 A1 * | 8/2010 | Kraemer | B01D 53/8656 | 423/239.1 |
| 2010/0229725 A1 * | 9/2010 | Farsad | B01D 53/1456 | 96/74 |
| 2010/0293973 A1 * | 11/2010 | Erickson | F01K 7/06 | 62/101 |
| 2010/0326084 A1 * | 12/2010 | Anderson | F01K 23/10 | 60/775 |
| 2011/0006529 A1 * | 1/2011 | Rose | F01K 3/245 | 290/52 |
| 2011/0011057 A1 * | 1/2011 | Bellows | F01K 13/02 | 60/39.182 |
| 2011/0147195 A1 * | 6/2011 | Shapiro | C02F 1/16 | 203/10 |
| 2012/0102970 A1 * | 5/2012 | Kraemer | F01K 17/02 | 60/801 |
| 2012/0159924 A1 * | 6/2012 | Tang | F01K 21/047 | 60/39.182 |
| 2012/0260667 A1 * | 10/2012 | Chillar | F02C 6/08 | 60/779 |
| 2012/0260668 A1 * | 10/2012 | Rogers | F01K 13/02 | 60/786 |
| 2013/0125841 A1 * | 5/2013 | Ichihara | F22D 1/02 | 122/420 |
| 2013/0160424 A1 * | 6/2013 | Broesamle | F02C 7/185 | 60/39.182 |
| 2013/0186435 A1 * | 7/2013 | Saha | F01D 25/002 | 134/36 |
| 2013/0244190 A1 * | 9/2013 | Marumoto | F01K 7/40 | 431/11 |
| 2013/0283796 A1 * | 10/2013 | Littleford | F01D 25/32 | 60/649 |
| 2014/0010748 A1 * | 1/2014 | Kim | B01D 53/8625 | 423/239.1 |
| 2014/0033676 A1 * | 2/2014 | Pang | F03G 6/00 | 60/39.182 |
| 2014/0202157 A1 * | 7/2014 | Shinnar | F01K 3/00 | 60/652 |
| 2014/0216365 A1 * | 8/2014 | Rancruel | F22D 5/00 | 122/7 R |
| 2014/0360204 A1 * | 12/2014 | Moorkanikkara | F02C 6/06 | 60/783 |
| 2015/0007575 A1 * | 1/2015 | Drouvot | F01K 17/025 | 60/772 |
| 2015/0033751 A1 * | 2/2015 | Andrew | E21B 43/16 | 60/775 |
| 2016/0195262 A1 * | 7/2016 | Geiger | F22D 1/003 | 122/421 |
| 2016/0376957 A1 * | 12/2016 | Kulkarni | F01D 25/305 | 60/39.5 |
| 2017/0259209 A1 * | 9/2017 | Nilsson | B01D 53/92 | |
| 2017/0261275 A1 * | 9/2017 | Nilsson | F01K 23/10 | |

* cited by examiner

FIG. 9

CONDENSING HEAT RECOVERY STEAM GENERATOR

FIELD

The invention relates to the field of boilers, and specifically to boilers of the heat recovery steam generator (HRSG) type.

BACKGROUND

It is known that heat recovery steam generators (HRSGs) allow recovering heat from a hot exhaust stream of a gas turbine to produce steam that can be used either in a process (cogeneration) or in a steam cycle (combined cycle). The exhaust gases are made of a non-condensable part, mostly containing $N_2$, $O_2$, $CO_2$ and Ar, and a condensable part made of water vapor. So far in prior art, the idea of fumes condensation has been discarded owing mainly to corrosion concerns.

Figure 1:
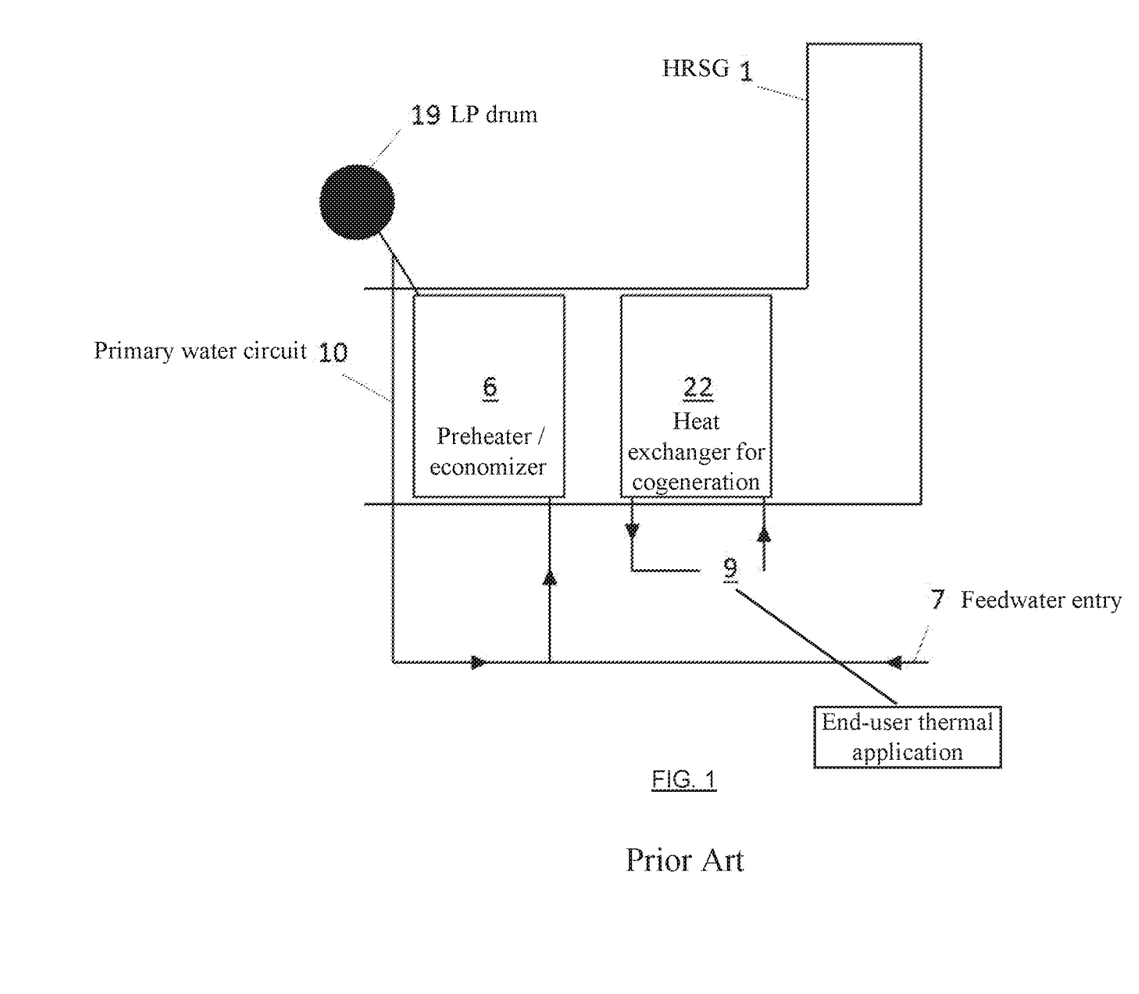
FIG. 1, already mentioned, schematically represents a first HRSG arrangement for cogeneration according to prior art.
Figure 2:
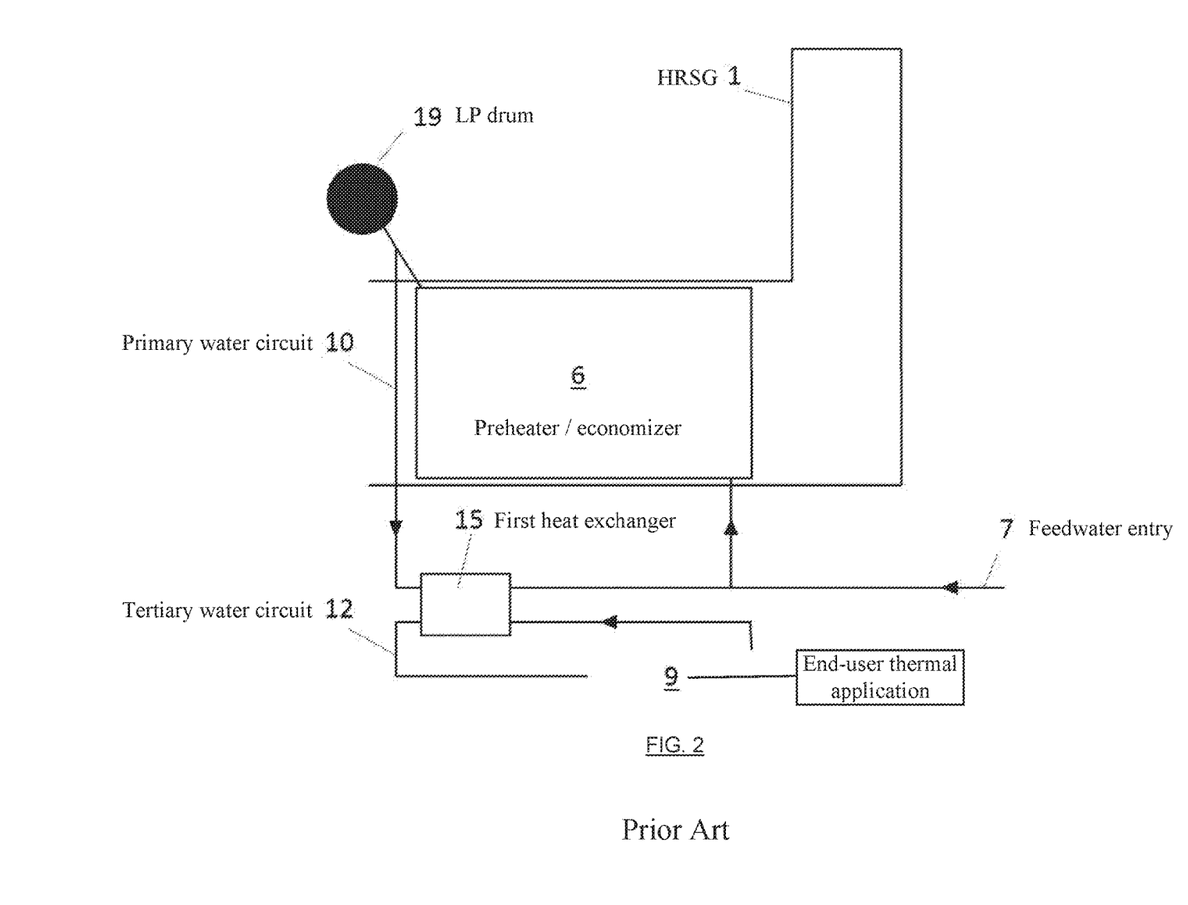
FIG. 2, already mentioned, schematically represents a second HRSG arrangement for cogeneration according to prior art.

It follows that HRSGs as known in the prior art face two types of limitations in their thermal performance. In the case of HRSGs providing a stream of pressurized hot water for cogeneration applications, as exemplified in FIG. 1 and FIG. 2, a trade-off exists between the amount of thermal power and the amount of electricity generated by the steam turbine (which is directly related to the steam production of the HRSG). This trade-off is sketched in FIG. 3 where the point "Prior art 1" relates to the HRSG arrangement in FIG. 1 and the point "Prior art 2" relates to the HRSG arrangement in FIG. 2. On the other hand, the presence of sulfur compounds raises dramatically the acid dewpoint of the exhaust gases. As a result, a large recirculation loop has to be used to warm the feedwater above this acid dewpoint. This leads to a rather large approach, i.e. the difference between the temperature at the outlet of the preheater and saturation temperature of the low pressure steam, as shown in FIG. 4.

Some prior art documents rely on a secondary/by-pass stack where additional heat recovery is performed. In WO 2015/039840 A2, extra recovered heat is used to preheat the condensate of the steam cycle. In WO 2010/136795 A2, extra recovered heat is used to preheat the combustion air of the boiler. Both documents are however specifically oriented to boilers fed by air and fossil fuel (e.g. coal, oil), and are not concerned with heat recovery steam generators included in a combined cycle. Both patents lead to improvement of the efficiency of the cycle by reducing the amount of fuel needed to produce a given amount of steam at prescribed conditions of temperature and pressure. Document CN101922821 A discloses a method for simultaneously recovering water and latent heat in high-humidity flue gas, and an absorption heat pump device, relating to the technique of energy-saving equipment. This prior art solution is however expected to provide acidic corrosion deposits.

SUMMARY

In an embodiment, the present invention provides a condensing heat recovery steam generator (cHRSG), including: a main stack for an exhaust hot gas main flow; a bypass stack for allowing a fraction of exhaust hot gas to bypass the exhaust hot gas main flow and to circulate in the bypass stack; a primary water circuit comprising a recirculation loop with a preheater, the latter being located at the entry of the exhaust hot gas main flow in the main stack, and a secondary water circuit provided with an end-user thermal application; a first heat exchanger for providing heat exchange between the primary water circuit and the secondary water circuit, so that the primary water circuit and the secondary water circuit are in thermal contact via the first heat exchanger but are not fluidly interconnected; a feedwater line fed at a first end with a condensate, and physically connected at a second end to the primary water circuit; and a heat recovery device for at least partially recovering latent heat contained inside the fraction of exhaust gas circulating in the bypass stack and for transferring said latent heat to the primary water circuit; wherein the heat recovery device includes a condensing area and is arranged so as firstly to contribute to a water preheating performed in the preheater of the primary water circuit, and secondly to transfer heat to the end-user thermal application in the secondary water circuit via the first heat exchanger.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The present invention provides a condensing heat recovery steam generator (cHRSG) that overcomes the two kinds of performance limitations of HRSG according to prior art. Specifically, the cHRSG is arranged in a manner that it can cope efficiently and reliably with the condensation of water vapor as well as of acidic products (e.g. $H_2SO_4$)

In an embodiment of the invention, the cHRSG includes a main stack for an exhaust hot gas main flow, a bypass stack for allowing a fraction of exhaust hot gas to bypass the exhaust hot gas main flow, and a heat pump. The cHRSG includes a primary water circuit that includes a recirculation loop with a preheater located at the entry of the exhaust hot gas main flow in the main stack, a secondary water circuit provided with an end-user thermal application, and a tertiary water circuit that includes a spray tower for providing a water shower flow in counter-current with the fraction of the exhaust hot gas circulating in the bypass stack, and an evaporator of the heat pump. The cHRSG additionally includes a feedwater line fed at a first end with a condensate, and physically connected at a second end to the primary water circuit, and provided with a condenser of the heat pump, a first heat exchanger for providing heat exchange between the feedwater line, and the secondary water circuit, and a second heat exchanger for providing heat exchange between the primary water circuit and the tertiary water circuit. In the cHRSG, a preheating performed in the preheater of the primary water circuit benefits from latent heat partially recovered in the tertiary water circuit from said exhaust hot gas circulating in the bypass stack through the second heat exchanger, and from additional heat extracted in the tertiary water circuit by said heat pump, and this latent and additional heat is ultimately transported to the end-user thermal application in the secondary water circuit through the first heat exchanger. The primary water circuit, the secondary water circuit, and the tertiary water circuit are in thermal contact via the first heat exchanger and the second heat exchanger but are not fluidly interconnected.

The present invention is concerned with the improvement of the thermal performance of HRSGs in both cases of cogeneration—i.e. combined "heat" (including cooling) and power, as well as power generation only. Accordingly, heat recovered in a by-pass stack for the hot gas main flow, at a cold-end of a HRSG, namely by condensing part of the water vapor contained in the fumes, is transferred to the feedwater of the steam cycle so that the latter is raised at a temperature above the dewpoint of the fumes at the inlet of the preheater. According to prior art, this duty is handled by a recirculation loop.

The cHRSG according to the invention pushes away the aforementioned limitations by making the heat carried by the recirculation loop available for other purposes. In the case of cogeneration, the cHRSG allows to maximize both the electricity and thermal production for a given enthalpy flow at the hot end of the HRSG.

Figure 3:
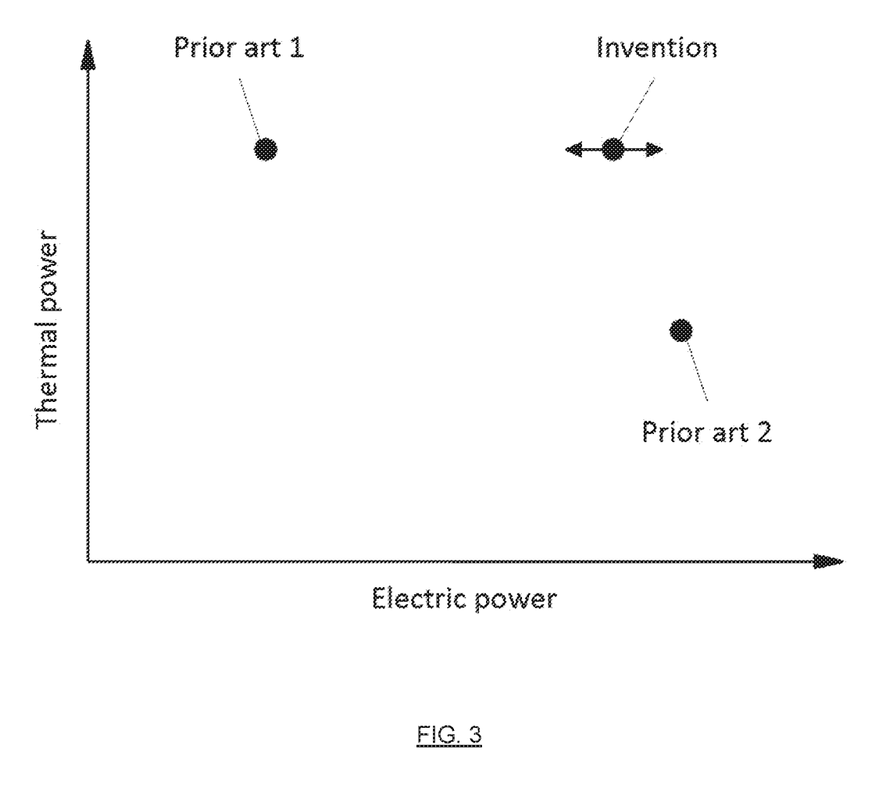
FIG. 3, already mentioned, is a sample map of the electricity vs. thermal production of a HRSG used for cogeneration which compares prior art solutions with the invention.
Figure 4:
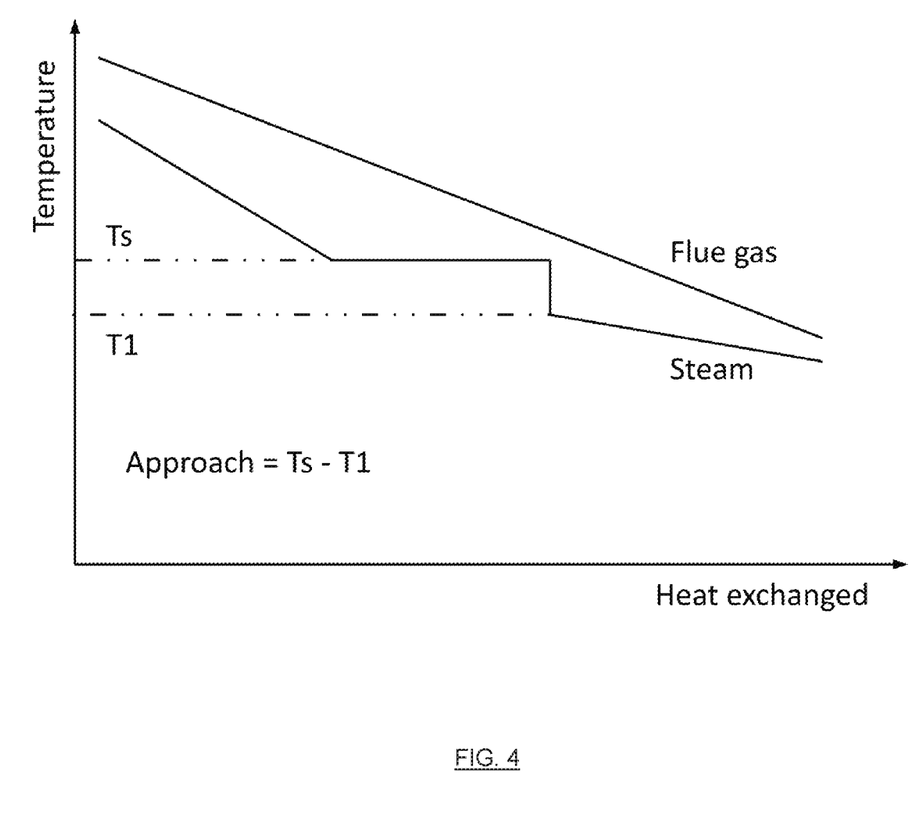
FIG. 4, already mentioned, is a notional graph of heat exchanged vs. temperature for a single-pressure level steam generator according to prior art.

As shown on FIG. 3, if the electric consumption of the auxiliary components of the cHRSG is neglected, the electric power of the cHRSG matches that of the Prior art 2 while producing at the same time a thermal power equal to that of the Prior art 1. Including the electric consumption of the auxiliaries will slightly reduce the net electric power from the steam cycle, hence shifting the representative point slightly to the left of the map.

In the case of acid dewpoint issues, the present invention allows either to drastically reduce the size of the recirculation loop or even to remove it. The steam generation (and hence electric production of the steam turbine) can therefore be increased.

Water vapor present in the gas turbine combustion products carries a sizeable amount of energy that is currently released into the atmosphere, but which could in principle be partially recovered by condensing the humidity contained in the exhaust gases. This complementary heat recovery would imply an exchange of latent heat, i.e. heat which is not transferred through a change in temperature, but through a phase change of the gas medium, in the present case condensation of the water vapor contained in the exhaust gases.

Figure 5:
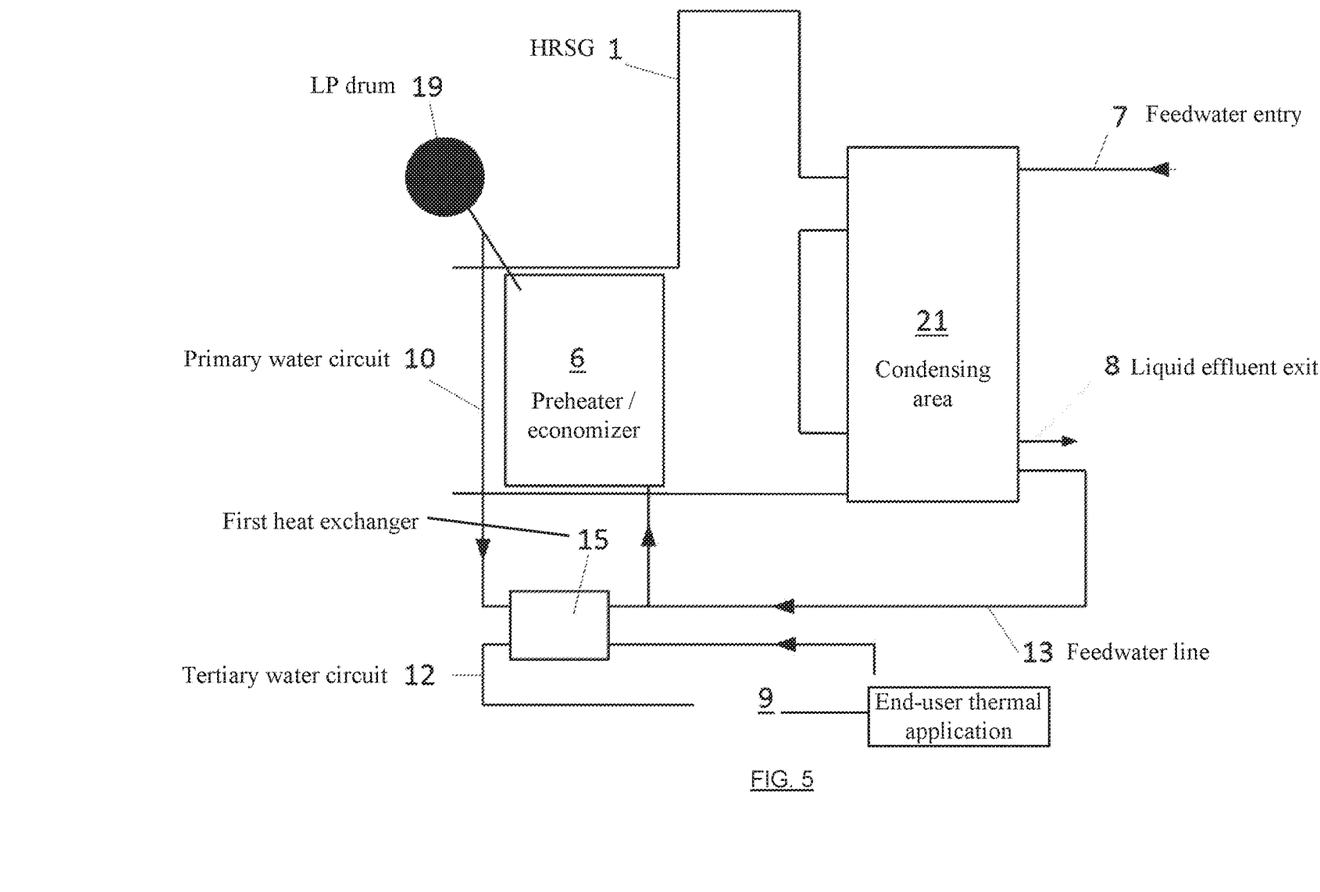
FIG. 5 schematically represents the general principle of a condensing HRSG according to the invention.

FIG. 5 schematically represents the general arrangement for a HRSG according to the present invention, where the focus is set on the cold side of the HRSG. Accordingly, the HRSG is supplemented by a "condensing area" 21, external to the main casing of the HRSG and featured with additional equipment intended for recovering latent heat from the exhaust gases of the HRSG, and for efficient handling of the resulting flow of effluent 8. A "condensing HRSG" is provided herein that implements additional recovery of latent heat in the exhaust gases through condensation thereof. A HRSG that provides improved cost with respect to the power output is also provided herein.

In an embodiment of the invention, the fraction of exhaust gas flow through the condensing area is controlled by means of a fan.

According to an embodiment of the invention, latent heat is reclaimed by means of a so-called direct-contact heat exchanger. Direct-contact heat exchangers can include, but are not limited to, a spray tower, a baffle-tray column, and a packed column.

In certain embodiments of the invention, a spray tower is selected as a direct-contact heat exchanger because it offers a good overall heat transfer coefficient, generates a moderate pressure loss on the gas side, and is relatively cheap. The spray tower can be seen as a quenching system disposed in the by-pass stack of the HRSG providing a shower where cool water is sprayed in a counter-flow arrangement through a fraction of the exhaust gas flow which will be cooled down. The fumes are then saturated in humidity, and this humidity will condense and release the vaporization energy of the fumes. Mixing the saturated fumes escaping from the by-pass stack with the fumes of the main stack reduces the risk of plume/white cloud formation.

In further alternative embodiments of the invention, alternative direct-contact heat exchangers are used instead of the spray tower.

Figure 6:
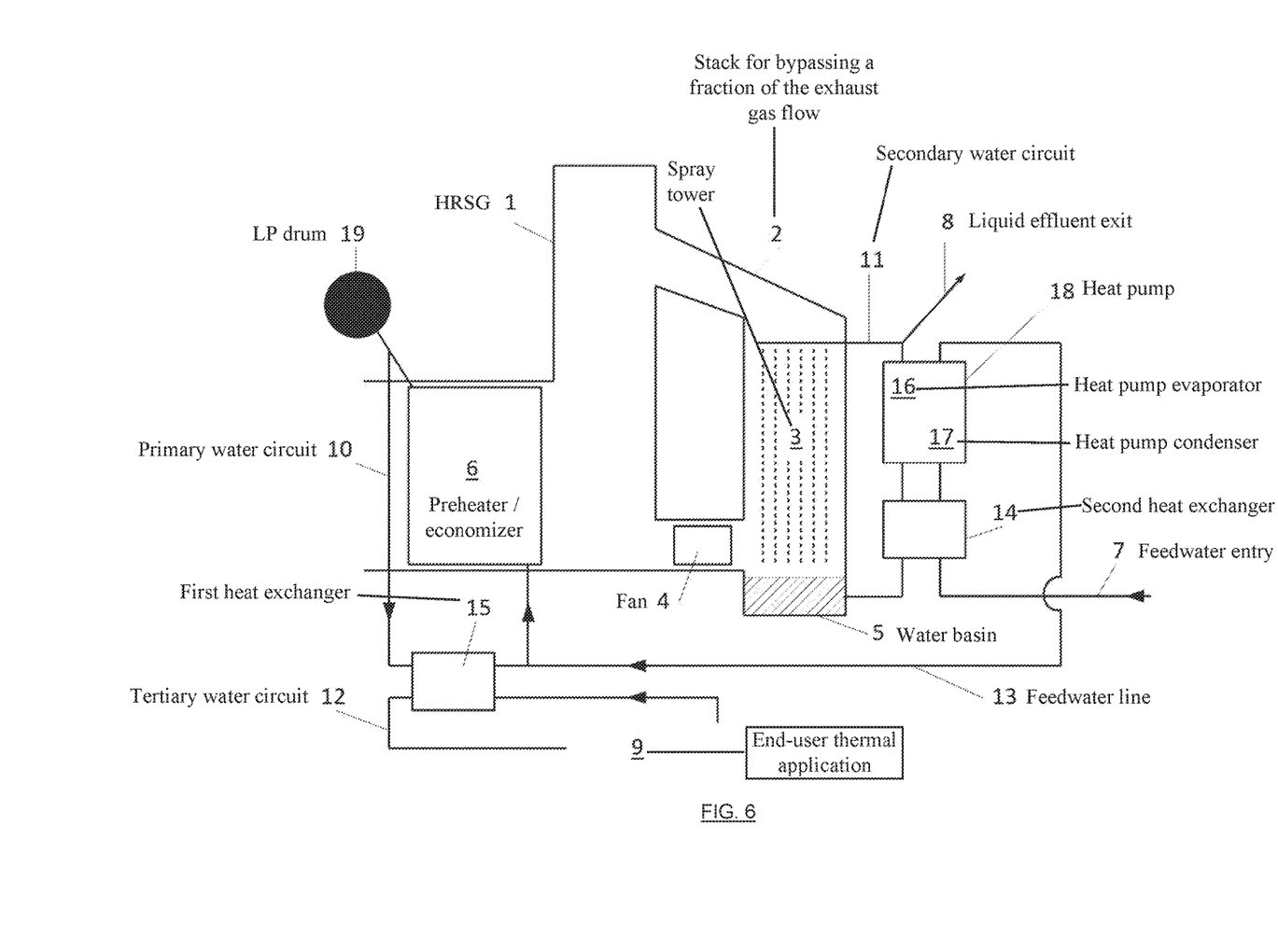
FIG. 6 schematically represents the principle of a condensing HRSG according to a first embodiment of the present invention.

FIG. 6 schematically represents an embodiment of a condensing HRSG according to the present invention. A horizontally arranged HRSG is composed of a main stack 1 for hot gas flow as well as of a bypass stack 2 for allowing a fraction of the exhaust gas flow to bypass the main flow. In this particular embodiment, the condensing HRSG is based on a direct-contact heat exchanger.

Three closed water circuits are provided which are physically separated (i.e. not fluidly interconnected) but thermally in contact via heat exchangers (described in more detail below). The primary water circuit (PWC) is a recirculation loop 10 which comprises the first heat exchanger of the HRSG (or preheater/economizer 6), the latter being essentially located at the entry of the hot gases in the main stack. The PWC is physically connected to the feedwater line 13, and is provided with the LP drum 19. The feedwater line 13 is fed at the feedwater entry 7, and is provided with a heat pump condenser 17 (HPC) (described in more detail below).

The secondary water circuit (SWC) is a recirculation loop 11 which comprises a spray tower 3 for providing a water shower flow in counter-current with the ascending exhaust fumes. The spray tower 3 is provided at its lower end with a water basin 5 and a heat pump evaporator 16 (HPE) (described in more detail below).

The tertiary water circuit (TWC) comprises a recirculation loop 12 and an end-user thermal application 9. The feedwater line 13/PWC 10 and SWC 11 are in thermal contact through the second heat exchanger 14 while PWC 10 and TWC 12 are in thermal contact through the first heat exchanger 15.

The primary, secondary and tertiary water circuits and the feedwater line are advantageously provided with a first pump, a second pump, a third pump and a fourth pump respectively (not shown). These pumps ensure appropriate pressure level in the corresponding circuits, and compensate for the additional pressure losses induced by the complementary equipment introduced according to the invention.

In prior art HRSGs, heating of the feedwater is typically achieved by means of a recirculation loop placed on a preheater that mixes the incoming external cold flow of condensate, preferably in the range 20° C.-50° C., with a hot flow of pressurized water reheated in the loop, preferably in the range 160° C.-190° C., to produce the required temperature level at the inlet of the HRSG, preferably in the range of 55° C.-80° C. The embodiment of the invention represented in FIG. 6 uses the above-described recovered latent heat to assist in performing this condensate flow heating, and in addition to use/exchange the heat transported in the recirculation loop 10 towards a number of possible thermal applications 9.

However, in the embodiment represented in FIG. 6, latent heat may be recovered at a relatively low temperature. Water temperature in the basin 5 of the spray tower 3 may be equal to the dewpoint of the exhaust gases at this location, i.e. in the range of 40° C.-50° C. for typical ambient conditions and for combustion of natural gas. As a result, only part of this low grade heat can be passively transferred to the condensate flow by means of a heat exchanger, such as the heat exchanger 14, which is typically a plate exchanger.

In the various embodiments of the invention, plate heat exchangers are utilized in order to take advantage of their high heat transfer coefficient, low pinch requirement, and limited bulk.

Further heating of the condensate flow to its required temperature implies moving thermal energy from a cold spot to a hotter one, which does not occur naturally by virtue of the second law of thermodynamics. Consequently, according to an embodiment of the invention, an industrial heat pump 18 is used to perform this heat transfer. The heat source, where heat is captured by the evaporator 16 of the heat pump (HPE), is the water flow through the spray tower while the heat sink, where heat is released from the condenser 17 of the heat pump (HPC), is the condensate flow. The device providing electric power necessary to the heat pump operation is not shown in the figures. Alternatively the industrial heat pump may be replaced by any system known in the art in order to recover energy from the quenching recirculation flow, and thus to decrease the shower inlet temperature.

Heat carried in the recirculation loop 10 (PWC) can then be used for other purposes, especially for a diversity of applications 9 requiring thermal energy at low-to-moderate temperature. In order not to mix water flows of different quality, i.e. the water going through the HRSG and the water used in said thermal applications 9, the heat is transferred to an auxiliary circuit 12 (TCW) by means of the first heat exchanger 15, which can also be, for example, a plate heat exchanger.

The flow of hot water generated by the invention could serve, for example, in the following non-exhaustive list of end-user thermal applications: direct use of the hot water flow to feed a district heating network, use of the hot water flow in thermally driven chillers (absorption and adsorption chillers are 3-source thermal machines that produce chilled water from hot water or steam), and use of chilled water to feed a district cooling network, use of the hot water flow to produce fresh water from sea water (water desalination) through a thermal process, such as, for example, Multi Effect Distillation (MED).

In alternative embodiments of the invention, two or even the three above applications may be combined to provide so-called tri-generation or even poly-generation (electricity, heat, cold and fresh water).

In yet alternative embodiments of the invention, the thermal load of the recirculation loop may be used to increase the steam production of the HRSG and hence the power generation of the steam turbine.

In steady-state operation a flow of effluent 8, generated by the partial condensation of the fumes, has to be released to the environment in order to maintain a steady level in the water basin of the spray tower.

Intimate contact of sprayed water with the fumes causes sprayed water becoming acidic. $CO_2$ contained in the fumes can dissolve in water. According to an embodiment, a water treatment unit WTU (not shown) can be utilized to increase the pH of this acidified water to a 6.0-8.0 pH range before releasing effluent 8 into the environment. A possible treatment relies on alkaline products such as calcium carbonate to neutralize the acidification of the water.

Figure 7:
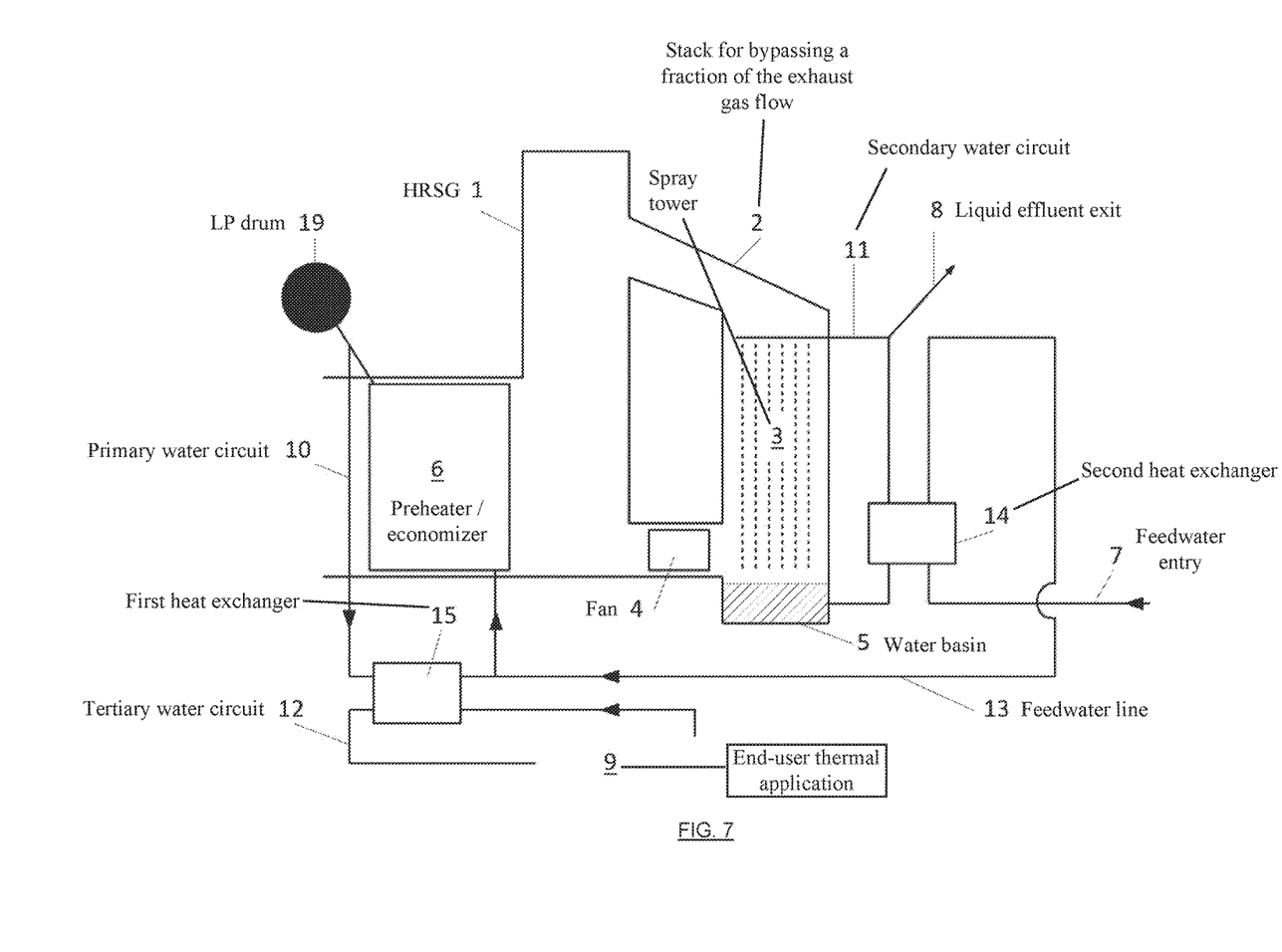
FIG. 7 schematically represents the principle of a condensing HRSG according to a second embodiment of the present invention.

FIG. 7 schematically represents yet another embodiment of a condensing HRSG according to the present invention. It differs from the embodiment depicted in FIG. 6 by the absence of a heat pump. This embodiment may be suited for cases where the water vapor concentration of the fumes is higher (e.g. a HRSG behind a humid gas turbine cycle).

Figure 8:
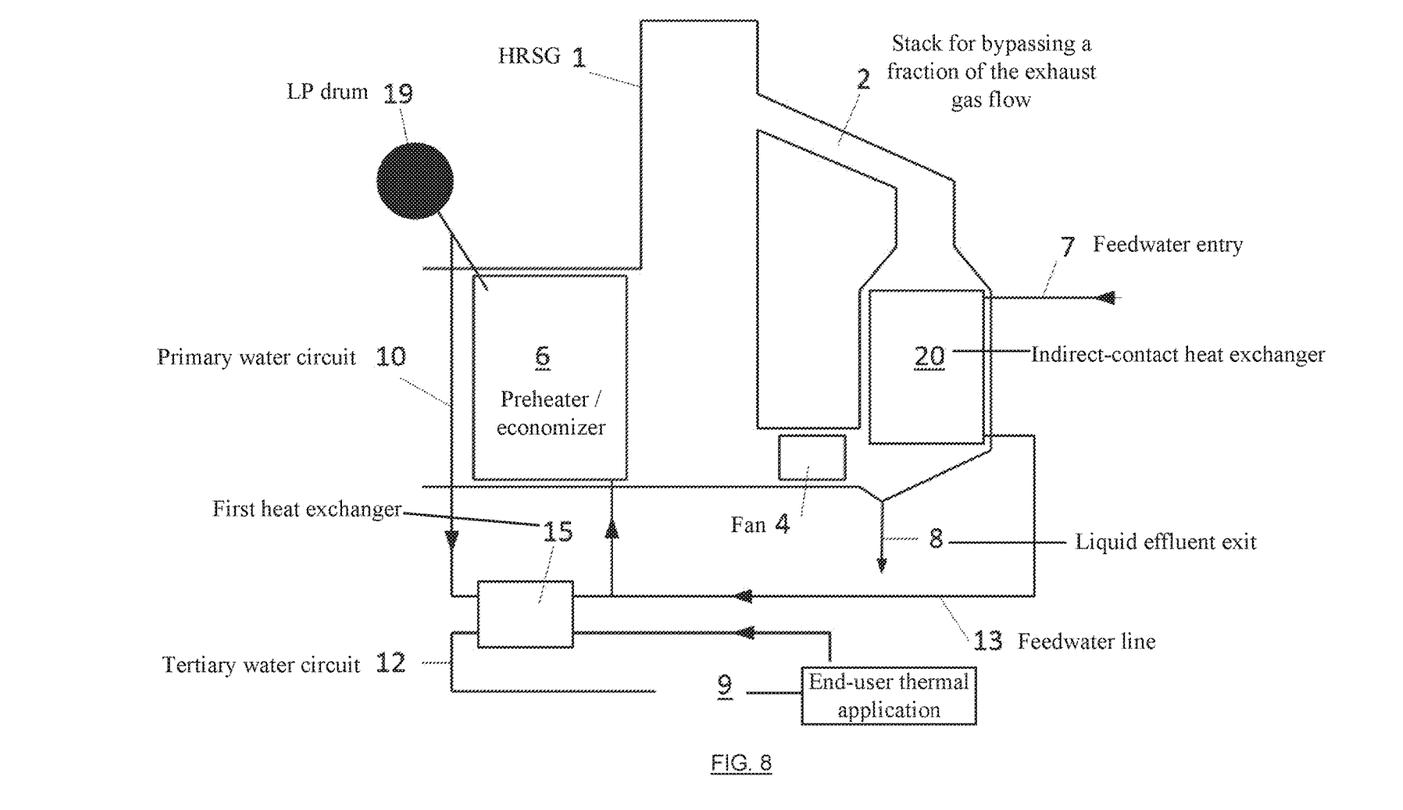
FIG. 8 schematically represents the principle of a condensing HRSG according to a third embodiment of the present invention.

FIG. 8 schematically represents yet another embodiment of a condensing HRSG according to the present invention. The partial recovery of the latent heat contained inside the fraction of exhaust gas circulating in the bypass stack 2 is effected by indirect-contact means comprising a section of the feedwater line 13 which is provided with an indirect contact heat exchanger 20 located inside the fraction of exhaust gas circulating in the bypass stack 2, so that, owing to condensation of the exhaust gas on a surface of the indirect contact heat exchanger 20, latent heat contained in the exhaust gas is transferred as above to the primary water circuit 10.

Partial condensation of the exhaust gases on the outer surface of the exchange area of the indirect contact heat exchanger also generates a flow of excess effluent 8 that has to be released to the environment after an appropriate treatment as discussed above.

Figure 9:
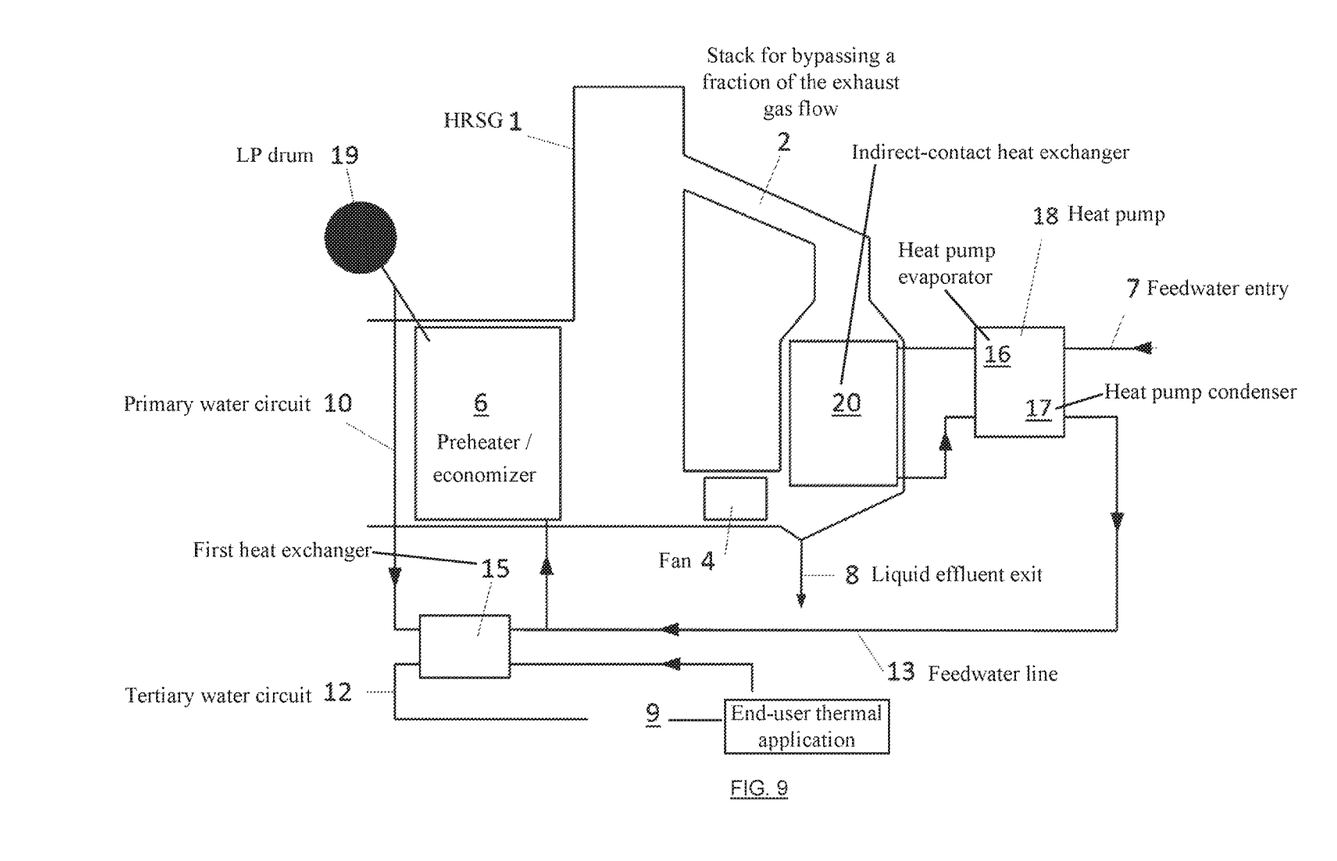
FIG. 9 schematically represents the principle of a condensing HRSG according to a fourth embodiment of the present invention.

FIG. 9 schematically represents yet another embodiment of a condensing HRSG according to the invention. With respect to the embodiment depicted in FIG. 8, the condensing heat recovery steam generator additionally comprises a heat pump. The section of the feedwater line 13 provided with an indirect contact heat exchanger 20 located inside the fraction of exhaust gas circulating in the bypass stack 2 comprises an evaporator 16 of the heat pump 18 and a recirculation part of the feedwater line 13 comprises a condenser 17 of the heat pump 18, so that additional heat is extracted in said section of the feedwater line 13 which is provided with an indirect contact heat exchanger 20, and transferred to the primary water circuit 10 by said heat pump 18. The capacity of energy transfer is thereby enhanced because the temperature of the condensate entering the indirect contact heat exchanger is lower.

The principles exposed in the present application are not limited to the example embodiments disclosed therein. In particular, the system can be operated continuously or intermittently according to energy demand, the system can be adapted to both vertical and horizontal HRSG.

Moreover, an embodiment of the invention provides additional equipment to an existing or prior art (non-condensing) HRSG and can integrate, within a given scope, the following features: a prescribed steam production, in terms of pressures, temperatures and mass flows (temperature, pressure and mass flow of water to a low pressure (LP) drum can be unmodified with respect to a reference HRSG), a requested minimum value for the feedwater temperature at the HRSG inlet in order to prevent condensation on the first finned tube heat exchanger (feedwater temperature at the HRSG inlet can be unmodified with respect to a reference HRSG), and a maximum level of pressure losses allowed in the exhaust gas side to ensure proper operation of the upstream gas turbine.

In further embodiments, the flow of treated effluent 8 may be advantageously used as a supply to various points of a combined cycle, such as make-up water for the steam cycle, make-up water for the cooling system, or water injection wherever best suited in the gas turbine cycle for the existing operating conditions. This last usage is expected to increase the water vapor content in the exhaust gases from the gas turbine. This would result in a "snowball effect" with additional condensation of the exhaust gases and additional latent heat recovery.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SYMBOLS

1 HRSG
2 Stack for bypassing a fraction of the exhaust gas flow
3 Spray tower
4 Fan
5 Water basin
6 Preheater/economizer
7 Feedwater entry (condensate from steam cycle)
8 Liquid effluent exit to environment or useful applications
9 End-user thermal application
10 Primary water circuit (preheater recirculation loop) or PWC
11 Secondary water circuit (spray tower recirculation loop) or SWC
12 Tertiary water circuit (thermal application recirculation loop) or TWC
13 Feedwater line (condensate at low temperature)
14 Second heat exchanger (between feedwater line and tertiary water circuit)
15 First heat exchanger (between primary and secondary water circuits)
16 Heat pump evaporator (HPE)
17 Heat pump condenser (HPC)
18 Heat pump
19 LP drum
20 Indirect-contact heat exchanger
21 Condensing area

The invention claimed is:

1. A condensing heat recovery steam generator (cHRSG) comprising:
a main stack for an exhaust hot gas main flow;
a bypass stack for allowing a fraction of exhaust hot gas to bypass the exhaust hot gas main flow and to circulate in the bypass stack;
a primary water circuit comprising a recirculation loop with a preheater, the preheater being located at an entry of the exhaust hot gas main flow in the main stack, and a tertiary water circuit provided with an end-user thermal application;
a first heat exchanger for providing heat exchange between the primary water circuit and the tertiary water circuit, so that the primary water circuit and the tertiary water circuit are in thermal contact via the first heat exchanger but are not fluidly interconnected;
a feedwater line fed at a first end with a condensate, and physically connected at a second end to the primary water circuit;
a heat recovery device comprising a second heat exchanger for at least partially recovering latent heat contained inside the fraction of exhaust gas circulating in the bypass stack and for transferring the latent heat to the primary water circuit; and
a heat pump,
wherein the second heat exchanger of the heat recovery device is arranged so as to contribute to a water preheating performed in the preheater of the primary water circuit, and to transfer heat to the end-user thermal application in the tertiary water circuit via the first heat exchanger,
wherein the heat recovery device further comprises a secondary water circuit having a spray tower with a water basin at a lower end thereof, the spray tower delivering a water shower flow exchanging heat directly and in counter-current with the fraction of the exhaust hot gas circulating in the bypass stack, the second heat exchanger of the heat recovery device providing heat exchange between the secondary water circuit and the feedwater line, and
wherein the secondary water circuit comprises an evaporator of the heat pump and the feedwater line comprises a condenser of the heat pump, so that additional heat is extracted in the secondary water circuit and transferred to the primary water circuit by the heat pump.

2. The condensing heat recovery steam generator according to claim 1, wherein the end-user thermal application is configured to directly use a hot water flow in the tertiary water circuit for feeding a district heating network.

3. The condensing heat recovery steam generator according to claim 1, wherein the end-user thermal application is configured to use a hot water flow in the tertiary water circuit in thermally driven chillers to produce chilled water for feeding a district cooling network.

4. The condensing heat recovery steam generator according to claim 1, wherein the end-user thermal application is configured to use a hot water flow in the tertiary water circuit for performing water desalination.

* * * * *